United States Patent
Kountotsis (10) Patent No.: US 8,750,581 B2
(45) Date of Patent: Jun. 10, 2014

(54) SYSTEM AND METHOD FOR FINGERPRINT RECOGNITION AND COLLECTION AT POINTS-OF-SALE AND POINTS-OF-ENTRY

(71) Applicant: Theodosios Kountotsis, Melville, NY (US)

(72) Inventor: Theodosios Kountotsis, Melville, NY (US)

( * ) Notice: Subject to any disclaimer, the term of this patent is extended or adjusted under 35 U.S.C. 154(b) by 0 days.

(21) Appl. No.: 13/691,773

(22) Filed: Dec. 1, 2012

(65) Prior Publication Data

US 2013/0094723 A1 Apr. 18, 2013

Related U.S. Application Data

(63) Continuation of application No. 12/802,491, filed on Jun. 8, 2010, now Pat. No. 8,345,939.

(51) Int. Cl.
*G06K 9/00* (2006.01)

(52) U.S. Cl.
USPC ............ 382/124; 382/115; 382/116; 382/125

(58) Field of Classification Search
None
See application file for complete search history.

(56) References Cited

U.S. PATENT DOCUMENTS

| | | | |
|---|---|---|---|
| 5,513,272 A * | 4/1996 | Bogosian, Jr. ................ 382/116 |
| 5,731,575 A * | 3/1998 | Zingher et al. ................ 235/379 |
| 6,522,772 B1 * | 2/2003 | Morrison et al. ............. 382/124 |
| 6,642,844 B2 * | 11/2003 | Montague ..................... 340/524 |
| 7,004,388 B2 * | 2/2006 | Kohta ............................. 235/381 |
| 7,472,825 B2 * | 1/2009 | Fitch et al. .................... 235/379 |
| 7,949,703 B2 * | 5/2011 | Matsuzaki et al. ........... 709/201 |
| 8,120,642 B2 * | 2/2012 | Jelinek et al. ................... 348/36 |
| 2002/0003470 A1 * | 1/2002 | Auerbach .................. 340/425.5 |
| 2002/0091937 A1 * | 7/2002 | Ortiz ............................. 713/200 |
| 2003/0123714 A1 * | 7/2003 | O'Gorman et al. ........... 382/124 |
| 2005/0259852 A1 * | 11/2005 | Russo ............................ 382/124 |
| 2007/0014443 A1 * | 1/2007 | Russo ............................ 382/124 |
| 2007/0036395 A1 * | 2/2007 | Okun ............................ 382/115 |
| 2009/0067679 A1 * | 3/2009 | Mainguet ...................... 382/115 |

* cited by examiner

*Primary Examiner* — Thomas Conway
(74) *Attorney, Agent, or Firm* — Theodosios Kountotsis (57) ABSTRACT

A method of apprehending a criminal, including scanning fingerprint images from a contact area of at least one item at a point-of-sale (POS) location and/or point-of-entry (POE) location and transmitting the fingerprint images to a local or remote electronic device to identify the criminal is presented. A fingerprint recognition and collection device is also presented including a fingerprint scanner for scanning fingerprint images from a contact area of at least one item; a transmitting unit for transmitting the fingerprint images; a receiving unit for receiving the fingerprint images; and an analyzing unit for analyzing the fingerprint images to identify persons of interest. The fingerprint scanner operates concurrently with a price scanner and/or ticket scanner. The fingerprint scanner is fixedly secured at the POS location and/or the POE location and operates concurrently with the price scanner and/or ticket scanner.

20 Claims, 7 Drawing Sheets

SYSTEM AND METHOD FOR FINGERPRINT RECOGNITION AND COLLECTION AT POINTS-OF-SALE AND POINTS-OF-ENTRY

CROSS-REFERENCE TO RELATED APPLICATIONS

This application is a continuation of U.S. patent application Ser. No. 12/802,491, filed on Jun. 8, 2010, the entire disclosure of which is incorporated by reference herein.

BACKGROUND

1. Field of the Related Art

The present disclosure relates to fingerprint recognition technology, and more particularly, but not exclusively, to methods and systems for automated fingerprint recognition, collection, transmission, reception, and storage at points-of-sale and/or points-of-entry, such as retail/grocery stores and entertainment venues.

2. Description of the Related Art

The need to identify and authenticate individuals is greater today than it has ever been, and is particularly acute for applications such as homeland security, law enforcement, electronic commerce, access control and privacy protection, to name a few.

The use of biometrics in general, and fingerprint recognition in particular, to identify and authenticate humans is a proven method. Biometrics is a group of technologies that provide a high level of security. Fingerprint capture and recognition is an important biometric technology. Law enforcement, banking, voting, and other industries increasingly rely upon fingerprints as a biometric to recognize or verify identity.

Fingerprint identification systems involve the use of a computer, which provides an identification probability for a match of a fingerprint to a prerecorded fingerprint held in a database. In this manner, fingerprint recognition devices have been employed for accessing high security areas. Fingerprint scanners are one form of fingerprint recognition devices. Fingerprint scanners having image sensors are available, which capture an image off a fingerprint. A signal representative of the captured image is then sent over a data communication interface to a host computer for further processing. For example, the host computer may perform one-to-one or one-to-many fingerprint matching.

Additionally, with crime in the United States and elsewhere on the upswing and with the relative supply of trained law enforcement personnel on the decline, the law enforcement community has been forced, in recent years, to investigate and consider the automatic processing of the large amounts of data it is required to maintain. One area of recent interest has been in the automatic processing of fingerprints.

Evidence from criminal activities and criminal suspects has long been analyzed to assist law enforcement officials in their attempts to determine who carried out a particular crime. Fingerprint identification is one of the oldest forms of forensic analysis of a crime scene. Fingerprints are often collected and analyzed in order to identify individuals who were at the scene of the crime or who have committed prior crimes. The fingerprints that are gathered may be compared with the prints of known individuals. Large numbers of fingerprints are collected and stored everyday in a wide range of applications including forensics, access control, and driver license registration. These fingerprints are kept on file and used to help law enforcement officials identify suspects, in modern times, computers have made it easy to compare a single fingerprint with a large number of fingerprints.

However, to perform identification and authentication in many of the applications envisaged today, collection of several samples of fingerprints in various environments is important. Thus, there is a need for automated (computer-assisted) fingerprint recognition, where a large number of fingerprints may be collected from various environments without sacrificing accuracy. Thus, there is a need in the fingerprint recognition art for a technological solution that overcomes at least in part the aforesaid deficiencies.

SUMMARY

The present disclosure provides a fingerprint recognition and collection device, including a fingerprint scanner for scanning fingerprint images from a contact area of at least one item; a transmitting unit for transmitting the fingerprint images; a receiving unit for receiving the fingerprint images; and an analyzing unit for analyzing the fingerprint images to identify persons of interest.

The present disclosure also provides a method of identity verification, including scanning fingerprint images from a contact area of at least one item via a fingerprint scanner; transmitting the fingerprint images via a transmitting unit; receiving the fingerprint images via a receiving unit; and analyzing the fingerprint images to identify persons of interest.

The present disclosure also provides a method of apprehending a criminal, including scanning fingerprint images from a contact area of at least one item at a point-of-sale (POS) location and/or point-of-entry location, and transmitting the fingerprint images to a local or remote electronic device to identify the criminal.

The present disclosure also provides a system for apprehending a criminal via a fingerprint recognition and collection device, including a processor; a computer-readable storage medium in communication with the processor, the computer-readable storage medium comprising one or more programming instructions for: scanning fingerprint images from a contact area of at least one item via a fingerprint scanner; transmitting the fingerprint images via a transmitting unit; receiving the fingerprint images via a receiving unit; and analyzing the fingerprint images to identify persons of interest.

The present disclosure also provides a system for apprehending a criminal via a fingerprint recognition and collection device, including a processor; a computer-readable storage medium in communication with the processor, the computer-readable storage medium comprising one or more programming instructions for: scanning fingerprint images from a contact area of at least one item at a point-of-sale (POS) location and/or point-of-entry location, and transmitting the fingerprint images to a local or remote electronic device to identify the criminal.

Further scope of applicability of the present disclosure will become apparent from the detailed description given hereinafter. However, it should be understood that the detailed description and specific examples, while indicating preferred embodiments of the present disclosure, are given by way of illustration only, since various changes and modifications within the spirit and scope of the present disclosure will become apparent to those skilled in the art from this detailed description.

BRIEF DESCRIPTION OF THE DRAWINGS

Various embodiments of the present disclosure will be described herein below with reference to the figures wherein.

It is noted that the drawings of the present disclosure are not to scale. The drawings are intended to depict only typical embodiments of the present disclosure, and therefore should not be considered as limiting the scope of the present disclosure. In the drawings, like numbering represents like elements between the drawings.

DETAILED DESCRIPTION

Although the present disclosure will be described in terms of a specific embodiment, it will be readily apparent to those skilled in this art that various modifications, rearrangements and substitutions may be made without departing from the spirit of the present disclosure. The scope of the present disclosure is defined by the claims appended hereto.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the present disclosure as claimed. The independent embodiments are considered to be able to be combined in whole or in part one with another as the claims and/or art may direct, either directly or indirectly, implicitly or explicitly. Moreover, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Prior to describing the present disclosure in further detail, it will first be helpful to define various terms that will be used throughout the following discussion. For example:

In this application, the use of the singular includes the plural unless specifically stated otherwise. In this application, the use of "or" means "and/or" unless stated otherwise. Furthermore, the use of the term "including," as well as other forms, such as "includes" and "included," is not limiting. Also, terms such as "element" or "component" encompass both elements and components comprising one unit and elements and components that comprise more than one subunit unless specifically stated otherwise.

The term "grocery store" may be defined as a store established primarily for the retailing of food and/or a marketplace where groceries are sold and/or a food service establishment selling commercially prepackaged foods and/or beverages.

The term "supermarket" may be defined as a large self-service grocery store selling groceries and dairy products and household goods and/or a self-service store offering a wide variety of food and household merchandise, organized into departments. A "supermarket" may be larger in size and have a wider selection than a traditional grocery store and it may be smaller than a hypermarket or superstore. A "supermarket" may also be defined as a complete market offering food and nonfood items, including some partial service departments.

Terms that are synonymous with the term "grocery store" may be mom-and-pop store, bodega, convenience store, corner store, food mart, marketplace, market, food store, retail food store, supermarket, deli, delicatessen, chain store, department store, general store, drug store, discount store, and or any type of retail establishment that sells "items" as defined below.

The term "items" may refer to goods, products, merchandise, commodities, food, produce, drinks, beverages, articles, objects, materials, alcohol, cleaning products, medicine, electrical products, greeting cards, houseware products, personal hygiene products, novelties, etc. An item may be anything that is sold in a "grocery store" and/or "supermarket" as defined above, and any of the synonyms used to describe a "grocery store" and/or "supermarket"

A "venue" may refer to any type of small or large, usually open structure for sports events and/or entertainment events, with tiered seating for spectators, A "venue" may be a stadium, ballpark, athletic field, howl, coliseum, diamond, gymnasium, ring, rink, arena, park, theater, amphitheater, etc. A "venue" may also be any type of entertainment venue or sporting event, where tickets are scanned in order for individuals to attend. A venue or arena may be any type of building or enclosure providing for entertainment and/or sports, where attendees present a ticket for entry.

The term "module" or "unit" may refer to a self-contained component (unit or item) that may be used in combination with other components and/or a separate and distinct unit of hardware or software that may be used as a component in a system, such as a fingerprint system. The term "module" may also refer to a self-contained assembly of electronic components and circuitry, such as a stage in a computer that may be installed as a unit. The term "module" may be used interchangeably with the term "unit."

The term "analyze" may refer to determining the elements or essential features or functions or processes of one or more fingerprint recognition and collection systems for computational processing. The term "analyze" may further refer to tracking data and/or collecting data and/or manipulating data and/or examining data and/or updating data on a real-time basis in an automatic manner and/or a selective manner and/or manual manner.

The term "storage" may refer to data storage. "Data storage" may refer to any article or material (e.g., a hard disk) from which information may be capable of being reproduced, with or without the aid of any other article or device. "Data storage" may refer to the holding of data in an electromagnetic form for access by a computer processor. Primary storage may be data in random access memory (RAM) and other "built-in" devices. Secondary storage may be data on hard disk, tapes, and other external devices, "Data storage" may also refer to the permanent holding place for digital data, until purposely erased, "Storage" implies a repository that retains its content without power. "Storage" mostly means magnetic disks, magnetic tapes and optical discs (CD, DVD, etc). "Storage" may also refer to non-volatile memory chips such as flash, Read-Only memory (ROM) and/or Electrically Erasable Programmable Read-Only Memory (EEPROM).

The term "electronic device" may refer to one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics may apply in any type of entertainment, communications, home, and/or office capacity. Thus, the term "electronic device" may refer to any type of electronics suitable for use with a circuit board and intended to be used by a plurality of individuals for a variety of purposes. The electronic device may be any type of computing and/or processing device.

The term "processing" may refer to determining the elements or essential features or functions or processes of one or more fingerprint recognition and collection systems for computational processing. The term "process" may further refer to tracking data and/or collecting data and/or manipulating data and/or examining data and/or updating data on a real-time basis in an automatic manner and/or a selective manner and/or manual manner.

As used herein, the term "fingerprint image" may be used to refer to any type of detected fingerprint including but not limited to an image of all or part of one or more fingerprints (partial patterns), a rolled fingerprint, a flat stationary fingerprint, a palm print, and/or prints of multiple fingers.

As used herein, the term "host processor" may be used to refer to any type of computer, processor(s), or logic which may receive and process fingerprint images detected by a remote fingerprint scanner. Such a processor may include software for performing one-to-one or one-to-many fingerprint matching and recognition or instead, for example in the case of a host processor used in a law enforcement vehicle, may be used to further transmit detected fingerprint image data to another processor for matching and recognition.

As used herein, the word "slide" may be interchangeably used with the word "swipe."

The present disclosure proposes a system and method of incorporating a price scanner at a grocery store and/or supermarket with a fingerprint scanner for passively detecting criminals purchasing products/items at such establishments. The present disclosure further proposes a system and method of incorporating a ticket scanner at an entertainment venue with a fingerprint scanner for passively detecting scanning tickets at such establishments. Thus, the present disclosure proposes the electronic acquisition of fingerprint images from a plurality of items and/or tickets that include fingerprints.

In the exemplary embodiments, the fingerprint recognition and collection device is not anticipated to be a portable device. The fingerprint recognition and collection device is anticipated to be fixedly secured in a specific location. For example, it may be fixedly secured at a point-of-sale (POS) location, located in a plurality of retail stores or at a point-of-entry (POE) location, located at one or more entertainment venues. Therefore, it is a non-portable device installed at specific locations of interest to detect criminals, fugitives, and other persons of interest.

In the exemplary embodiments, the fingerprint recognition and collection device is not anticipated as a locking or unlocking mechanism/configuration. The fingerprint recognition and collection device is not intended as a security device for locking/unlocking areas and/or vehicles and/or homes, etc. A locking/unlocking device function is not anticipated by the present embodiments. In contrast the fingerprint recognition and collection device is anticipated to aid law enforcement personnel to apprehend/capture persons of interest (e.g., criminals, fugitives). The present disclosure proposes a system and method for detecting criminals, apprehending criminals, and averting criminals, as well as potential terrorist activities.

The present disclosure further proposes a fingerprint recognition and collection device that scans items the surface area of an item) for fingerprints, not the finger itself. In other words, it is a passive detection system, since it does not require the direct scanning of a finger. The embodiments of the present disclosure focus on scanning contact areas or surface areas, where fingerprints are located.

Reference will now be made in detail to embodiments of the present disclosure. While certain embodiments of the present disclosure will be described, it will be understood that it is not intended to limit the embodiments of the present disclosure to those described embodiments. To the contrary, reference to embodiments of the present disclosure is intended to cover alternatives, modifications, and equivalents as may be included within the spirit and scope of the embodiments of the present disclosure as defined by the appended claims.

Embodiments will be described below while referencing the accompanying figures. The accompanying figures are merely examples and are not intended to limit the scope of the present disclosure.

Figure 1:
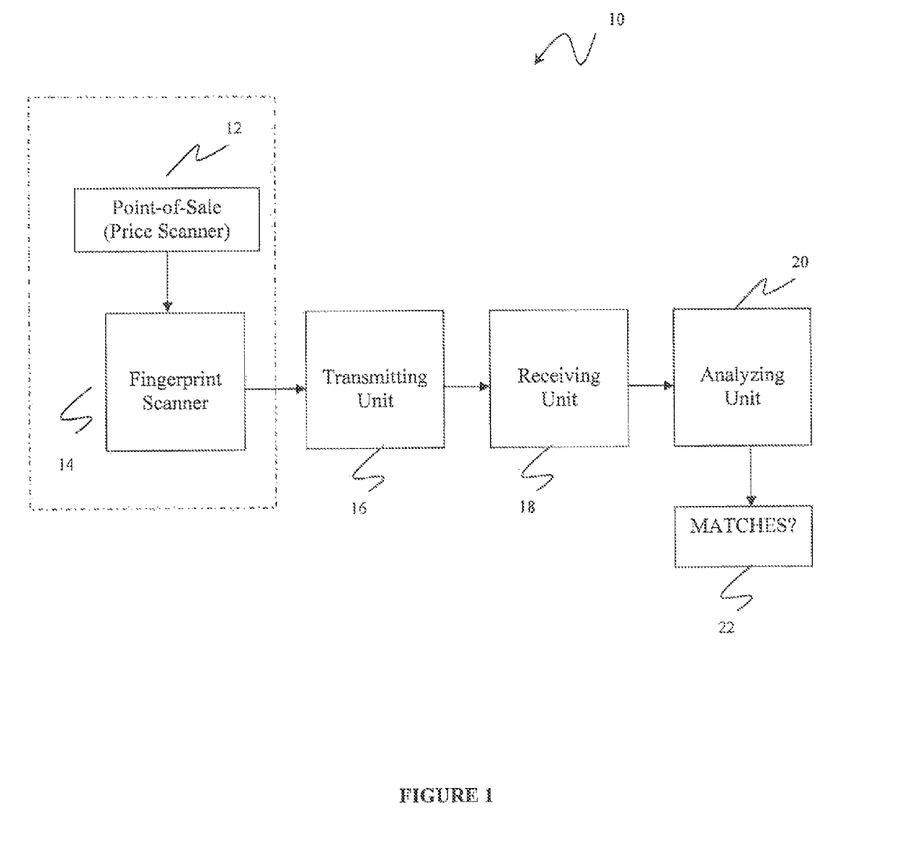
FIG. 1 is a system block diagram of a fingerprint scanner operating in cooperation with a price scanner at a point-of-sale (POS), in accordance with the present disclosure.

With reference to FIG. 1, there is presented a system block diagram of a fingerprint scanner operating in cooperation with a price scanner at a point-of-sale, in accordance with the present disclosure.

The system block diagram 10 includes a price scanner 12 and a fingerprint scanner 14. The price scanner 12 and the fingerprint scanner 14 may operate concurrently to collect data/information. The price scanner 12 and the fingerprint scanner 14 may be located or installed at a point-of-sale (POS) location. For example, the POS location may be cash registers at a supermarket or grocery store. Of course, it is contemplated that such POS location may be any type of retail establishment selling items, as defined herein.

The price scanner 12 scans barcodes of items, whereas the fingerprint scanner 14 scans for fingerprints on the items, concurrently, continuously, and in real-time. The data/information collected from the fingerprint scanner 14 may be transmitted via a transmission unit 16 to a receiving unit 18. The receiving unit 18 may include sending the data/information to an analyzing unit 20 for analyzing the data/information. The analyzing unit 20 may make a determination of whether any matches 22 have occurred. In other words, a determination is made as to whether a criminal or fugitive or person of interest has frequented a particular store or stores by collecting fingerprint data/information from items touched by the customer/consumer and transmitting such data/information to a local or remote location where such data/information is analyzed by law enforcement personnel.

Thus, the system block diagram 10 may be used at a grocery store or supermarket, as defined herein. At the grocery store, a grocery store scanner (e.g., a price scanner 12) may read, decode, and charge consumers in a matter of seconds. Every grocery store scanner is a bar code scanner equipped with a laser beam light that translates the binary code of every Universal Product Code (UPC) into its coinciding price. When the items are scanned at the register (e.g., a checkout station, cash register, etc.), the UPC code may be identified from the database and the price may be entered into the register, almost simultaneously. Each UPC code has been assigned a price that has been stored into the grocer's database.

Any item found in a grocery store has its own UPC somewhere on the label. The UPC code consists of two parts: the barcode that is read by the register and the barcode visible to the human eye, (which is, e.g., a 12-digit number). The first six digits of any UPC identify the manufacturer, the next live digits identify the product, and the last digit is referred to as a check digit. Some UPC codes are short, usually eight digits, but that is only because the shorter UPC has "suppressed the zeros," meaning the four missing numbers would have been a series of zeros. This particular barcode is usually reserved for the smaller products like an individual soda.

Similarly, as the price scanner 12 at the grocery store scans the barcode to charge a customer, the fingerprint scanner 14 operates in cooperation and concurrently with the price scanner 12 in order to collect fingerprints on the contact surface of the items touched by the consumer/customer. It is noted that the store clerk need not know that a fingerprint is being collected. It is anticipated that the store clerk will probably scan the items a few times to properly scan the barcode to obtain the price of the item. As such, the store clerk will inadvertently scan fingerprints located on the contact surface of the items as he/she attempts to find or properly scan the price barcode. As such, fingerprints may also be collected at a cash register/POS location/retail establishment, as the price scanner performs its job.

A Point of Sale (POS) system refers to the area of a store where customers may pay for their purchases. The term is normally used to describe systems that record financial transactions. This could be an electric cash register or an integrated computer system which records the data that comprises a business transaction for the sale of goods or services. In the present disclosure, the term "POS system" may be used interchangeably with cash registers and/or a cash management system. Thus, a Point-of-sale (POS) location is defined to mean a location that is publicly accessible where purchase of particular products/items may be made. The point-of-sale location may be associated with a physical store. The POS location may be located anywhere "items" are sold, such as grocery stores and/or supermarkets, as defined herein.

In general, a fingerprint scanner system has two basic jobs. It needs to get an image of a finger, and it needs to determine whether the pattern of ridges and valleys in this image matches the pattern of ridges and valleys in pre-scanned images. There are a number of different ways to get an image of an individual's finger. The most common methods today are optical scanning and capacitance scanning. Both types come up with the same sort of image, but they go about it in different ways. For instance:

The heart of an optical scanner is a charge coupled device (CCD), the same light sensor system used in digital cameras and camcorders, A CCD is simply an array of light-sensitive diodes called photosites, which generate an electrical signal in response to light photons. Each photosite records a pixel, a tiny dot representing the light that hit that spot. Collectively, the light and dark pixels form an image of the scanned scene (e.g., a finger). Typically, an analog-to-digital converter in the scanner system processes the analog electrical signal to generate a digital representation of this image. The scanning process commences when a person places a finger on a glass plate, and a CCD camera takes a picture. The scanner has its own light source, typically an array of light-emitting diodes, to illuminate the ridges of the finger.

Like optical scanners, capacitive fingerprint scanners generate an image of the ridges and valleys that make up a fingerprint. However, instead of sensing the print using light, the capacitors use electrical current. The sensor is made up of one or more semiconductor chips containing an array of tiny cells. Each cell includes two conductor plates, covered with an insulating layer. The cells are tiny, that is, smaller than the width of one ridge on a finger. The sensor is connected to an integrator, an electrical circuit built around an inverting operational amplifier.

Most fingerprint scanner systems compare specific features of the fingerprint, generally known as minutiae. Typically, human and computer investigators concentrate on points where ridge lines end or where one ridge splits into two (bifurcations). Collectively, these and other distinctive features are sometimes called typica. The scanner system software uses highly complex algorithms to recognize and analyze these minutiae. The basic idea is to measure the relative positions of minutiae, in the same sort of way you might recognize a part of the sky by the relative positions of stars. Therefore, in general, a fingerprint recognition and collection device may include an optical system that has a prism and a lens system, as known in the prior art (and discussed above with reference to optical scanners and capacitive scanners). Other optical systems may be used in the present disclosure as would be apparent to a person skilled in the art.

Figure 2:
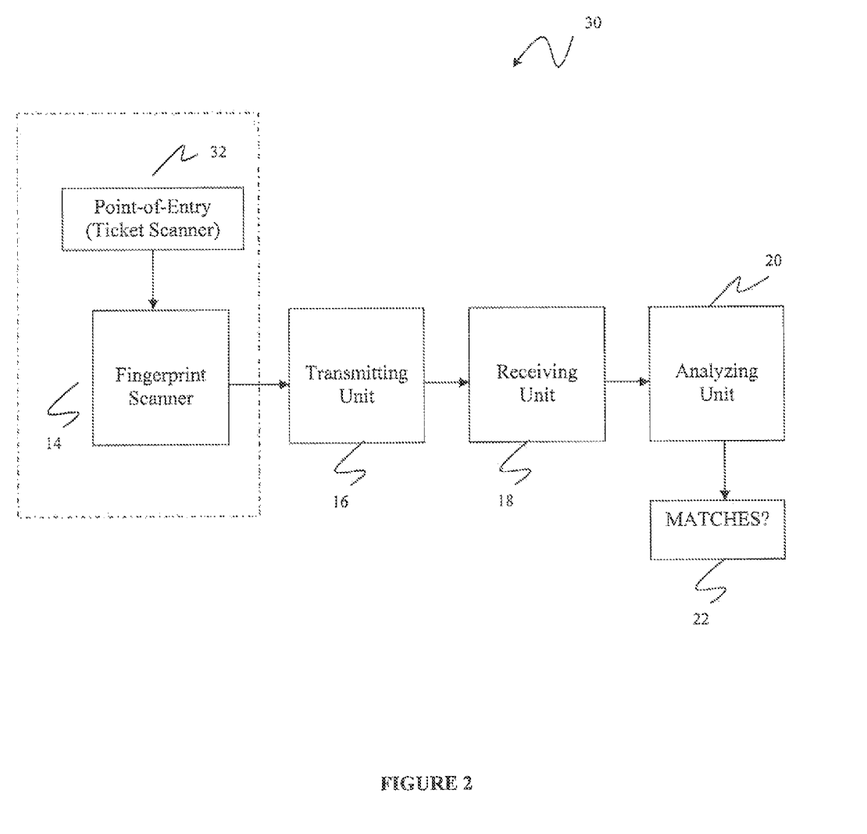
FIG. 2 is a system block diagram of a fingerprint scanner operating in cooperation with a ticket scanner at a point-of-entry (POE), in accordance with the present disclosure.

With reference to FIG. 2, there is presented a system block diagram of a fingerprint scanner operating in cooperation with a ticket scanner at a point-of-entry, in accordance with the present disclosure.

The system block diagram 30 is similar to the system block diagram 10 of FIG. 1. Therefore, similar elements to FIG. 1 will not be described in detail. In contrast to FIG. 1, FIG. 2 includes a ticket scanner 32 at a point-of-entry (POE). The ticket scanner 32 of FIG. 2 replaces the price scanner 12 of FIG. 1. However, it is contemplated that both may operate at the same time with a fingerprint scanner 14, as described below.

Therefore, instead of a POS system, the exemplary embodiments of the present disclosure may be implemented with a point-of-entry (POE) system. For example, a POE location may be at sporting event venues or entertainment venues (e.g., baseball games, basketball games, football games, hockey games, concerts, etc) For example, each attendee at a sporting event or concert must have a ticket. The ticket must be scanned for entry into the sporting event or concert. The ticket is usually held by the individual entering the sporting event or concert. As a result, the fingerprint scanner may be fixedly secured with the ticket scanner at a sporting event or concert to scan, collect, and transmit the fingerprint images to a local and/or remote location. Law enforcement agents may have access to a database or a plurality of databases where such fingerprint images are stored in order to compare such fingerprint images to pre-stored or prerecorded fingerprint images for the detection/identification of persons of interest (e.g., criminals, fugitives, etc.). The law enforcement personnel may perform identity verification that includes at least one of pending lawsuits, judgments, liens, criminal records, charges, and convictions.

The systems disclosed in FIGS. 1 and 2 support a plurality of scanner and/or sensor types, inclusive of, but not restricted to capacitive, thermal, optical, tactile, or ultrasonic sensors. The application of these sensors is determined by accuracy, user friendliness, and time for processing. The exemplary embodiments of the present disclosure may be implemented by using any of these types of scanners/sensors. For example:

The optical fingerprint sensors enable non-contact fingerprint image detection with a high degree of accuracy. Human fingers consist mainly of three layers, namely-scarfskin, inner skin and tissues under the skin. There are concavo-convex shaped formations, called ridge and valleys on the inner skin. The scarfskin shows these shapes present on the inner skin, these shapes define the fingerprint of the person. As light is transmitted through the tissue a unique pattern of transmittance of light depending on the concavo-convex formation on the inner skin is generated. Each fingerprint has a unique pattern of concavity and convexity and thus each of them generates a pattern that may be distinguished from another.

The capacitive fingerprint sensor works on the principle of capacitance. Capacitance may be defined as the ability to hold electrical charge. The capacitive fingerprint sensor eliminates the limitations of optical scanners. Problems such as edge distortion, misaligned optics, low-image resolution and scratched platens may be easily done away with. Normally parallel plate sensors are employed. A capacitive fingerprint sensor may contain many thousands of capacitive plates, each of which has its own associated electrical circuitry embedded in the form of integrated chips. As soon as a finger is placed on the sensor, an extremely weak electrical charge is built up. This electrical current builds up in a pattern that is determined by the capacitances corresponding to the ridges, valleys and pores that characterize a fingerprint.

Thermal fingerprint sensors use micro heaters as the sensing element. The sensing elements are placed in an array. These are micro resistors made of sputtered, very fine platinum film and are placed on a flexible polyamide film substrate. There exists a temperature difference between the skin ridges and the air caught in the fingerprint valleys. The sensor measures and uses this temperature differential to map the fingerprint image. The advantage of using this method is that it is capable of generating a high quality image even on poor quality fingerprints like dry, worn or with little depth between the peaks and valleys of the fingerprint. It may also be used under adverse conditions like extremes of temperature, high humidity, dirt, and oil or water contamination.

Another type of sensor commonly used for fingerprint sensors is the tactile fingerprint sensor. It works on the principle of change in resistivity of a peizoresistive material. As a user passes his finger over the sensor, deflections in the microbeam occur. This deflection corresponds to the ridges and the valleys that characterize the fingerprint. Fingerprint detection is based on the measurement of this deflection. The deflection may be measured by means of piezoresistive gauge. Resistivity change in the piezoresistive gauge is a measure of the deflection. The sensor includes electronic controls that are necessary to scan the row of microbeams and to amplify the signal from the gauges.

Ultrasonic sensors are also used for fingerprint recognition. They employ the basic theory of reflection, diffraction and scattering. When two solid objects are placed against each other, the contact between the surfaces of the two objects is not ideal, i.e., there are some inhomogeneities. As sound waves travel through these surfaces they undergo a phenomenon called contact scattering, along with getting reflected, diffracted and scattered as explained by classical theory of light. This phenomenon effects the sound propagation in the area of contact between the two objects. Using an ultrasonic camera the contact scattered rays are measured to generate the fingerprint image.

Figure 3:
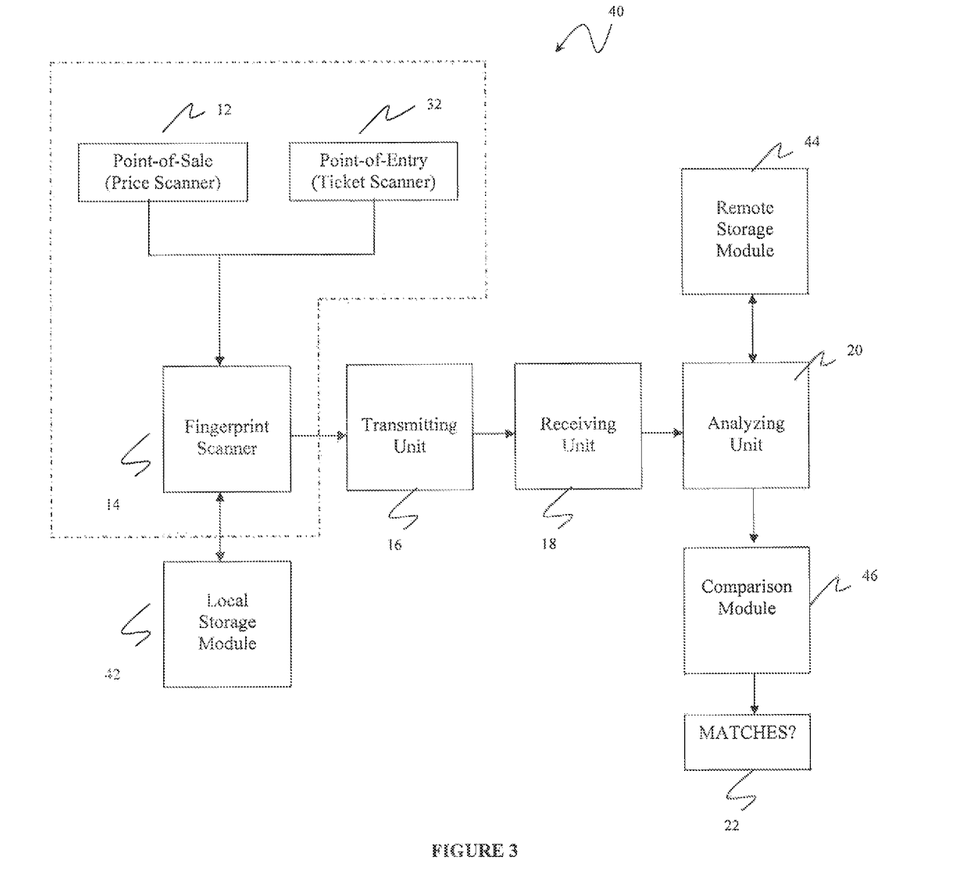
FIG. 3 is a system block diagram of a fingerprint scanner operating in cooperation with a price scanner and/or a ticket scanner at a point-of-sale/point-of-entry, further illustrating local and remote storage units and a comparison module, in accordance with the present disclosure.

With reference to FIG. 3, there is presented a system block diagram of a fingerprint scanner operating in cooperation with a price scanner and/or a ticket scanner at a point-of-sale/point-of-entry, further illustrating local and remote storage units and a comparison module, in accordance with the present disclosure.

The system block diagram 40 is similar to the system block diagram 10 of FIG. 1 and the system block diagram 30 of FIG. 2. Therefore, similar elements to FIGS. 1 and 2 will not be described in detail. In contrast to FIGS. 1 and 2, FIG. 3 includes a local storage module 42, a remote storage module 44, and a comparison module 46.

The storage modules 42, 44 may be databases. These storage modules 42, 44 may include a plurality of records. The storage modules 42, 44 may be centralized (as in a fingerprint repository) or distributed (as in a plurality of fingerprint scanners). The records may be stored in the form of a table, list, or other data structure (or combination of data structures) known to those of skill in the art. Each of the records may include an identifier field, which stores a unique identifier associated with a person of interest. Thus, each of the records in the storage modules 42, 44 is associated with a person of interest. The unique identifier stored in the identifier field may take the form of a name, number, address, etc.

The comparison module 46 may include a processing unit for comparing collected fingerprint samples/patterns/images to stored fingerprint samples/patterns/images. The stored fingerprint samples/patterns/images may be included in the storage modules 42, 44 described above.

Figure 4:
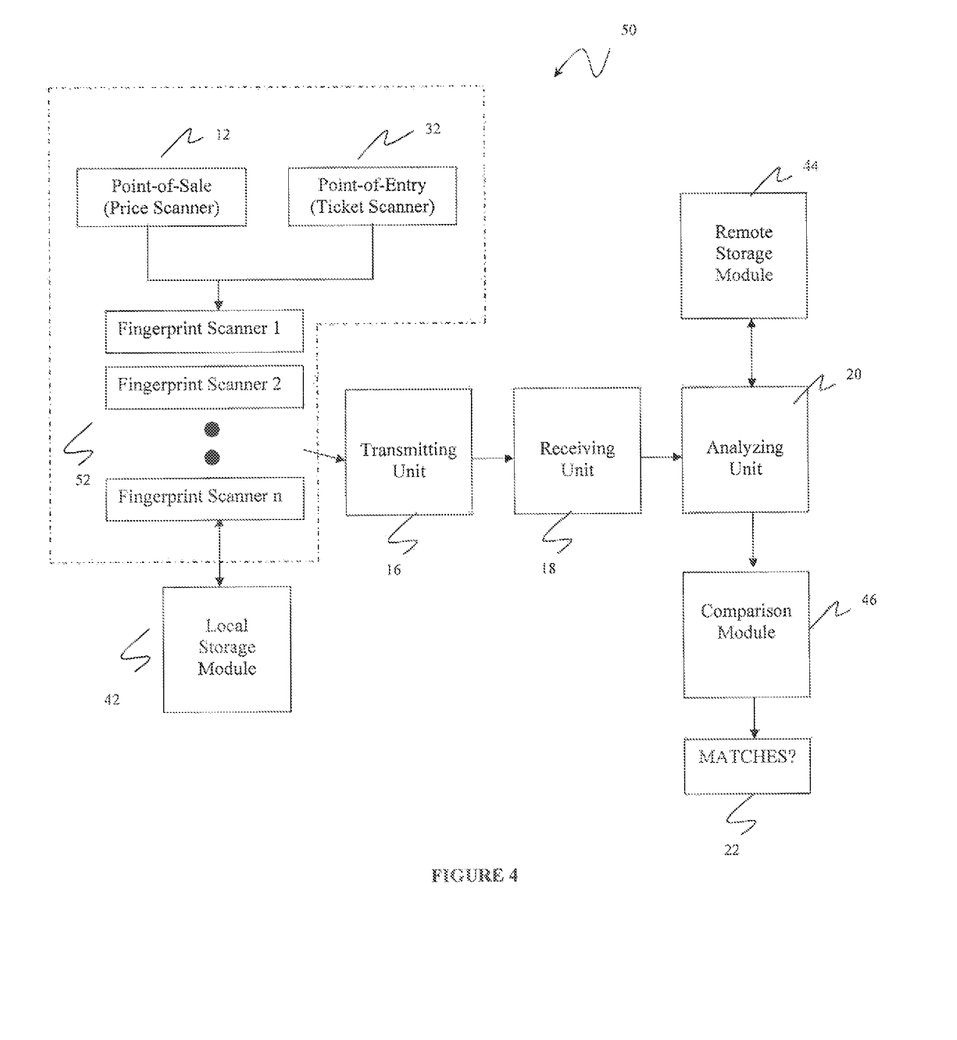
FIG. 4 is a system block diagram including a plurality of fingerprint scanners operating in cooperation with a price scanner and/or a ticket scanner at a point-of-sale/point-of-entry for scanning the contact area of the at least one item from a plurality of angles, in accordance with the present disclosure.

With reference to FIG. 4, there is presented a system block diagram including a plurality of fingerprint scanners operating in cooperation with a price scanner and/or a ticket scanner at a point-of-sale/point-of-entry for scanning the contact area of the at least one item from a plurality of angles, in accordance with the present disclosure.

The system block diagram 50 is similar to the system block diagram 40 of FIG. 3. Therefore, similar elements to FIG. 3 will not be described in detail. In contrast to FIG. 3, FIG. 4 includes a plurality of fingerprint scanners 52.

Thus, the fingerprint scanner 14 of FIGS. 1-3 may consist of a collection of fingerprint scanners 52 strategically positioned in a vicinity of the price scanner 12 and/or ticket scanner 32 to scan the contact area (or surface area) of the at least one item from a plurality of angles. By taking multiple snapshots of the fingerprints on the contact area, there may be a higher probability that a clear fingerprint image will be collected. The clearer the image, the higher the likelihood that an accurate and correct match will be made.

Figure 5:
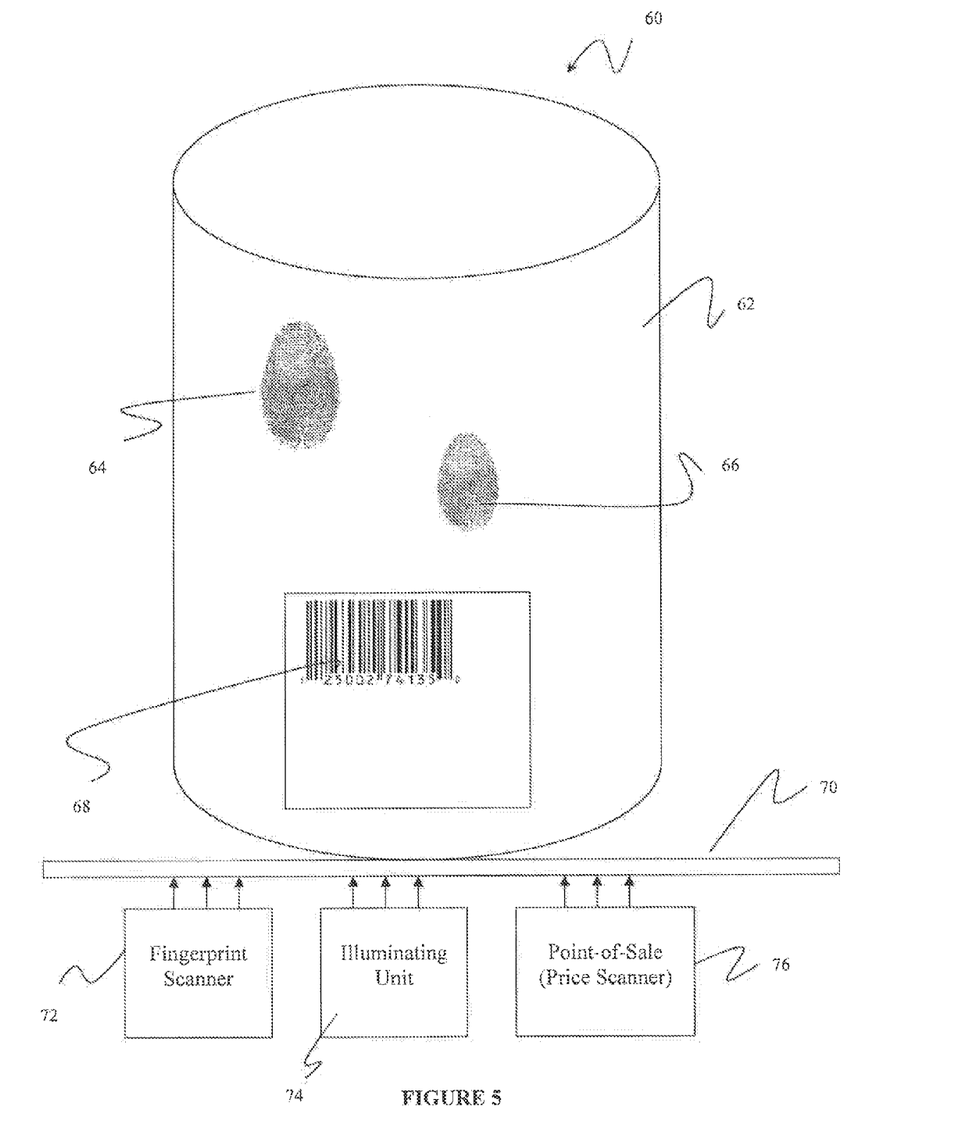
FIG. 5 is a perspective view of a food item having a barcode and one or more fingerprints, the barcode and fingerprints being concurrently scanned by a fingerprint scanner and a price scanner at a point-of-sale, in accordance with the present disclosure.

With reference to FIG. 5, there is presented a perspective view of a food item having a barcode and one or more fingerprints, the barcode and fingerprints being concurrently scanned by a fingerprint scanner and a price scanner at a point-of-sale, in accordance with the present disclosure.

The system 60 includes a food item 62 having a first fingerprint 64 and a second fingerprint 66. The food item 62 also includes a barcode 68. The fingerprints 64, 66 may be fingerprints of a consumer who wishes to buy such food item 62. A store clerk (not shown) may handle the food item 62 by scanning the food item 62 over a piece of glass 70. Under the piece of glass 70 may be positioned a fingerprint scanner 72, a price scanner 76, and an illuminating unit 74. As the store clerk makes several attempts to scan the barcode 68 over the price scanner 76, the store clerk also inadvertently scans the fingerprints 64, 66 over the fingerprint scanner 72. Optionally, such fingerprints 64, 66 may then be collected and transmitted to local or remote storage modules 42, 44 (see FIGS. 3 and 4) for storage. Additionally, such fingerprints 64, 66 may be collected and transmitted via a transmitting unit 16 to a receiving unit 18 in operable communication with an analyzing unit 20 (see FIG. 1). The fingerprint images 64, 66 may be analyzed by law enforcement personnel to determine if the collected fingerprints 64, 66 match fingerprints stores in local or remote storage modules 42, 44 of criminals, fugitives or any other persons of interest. Of course, the fingerprints 64, 66 may be collected from any "item" as defined herein.

Figure 6:
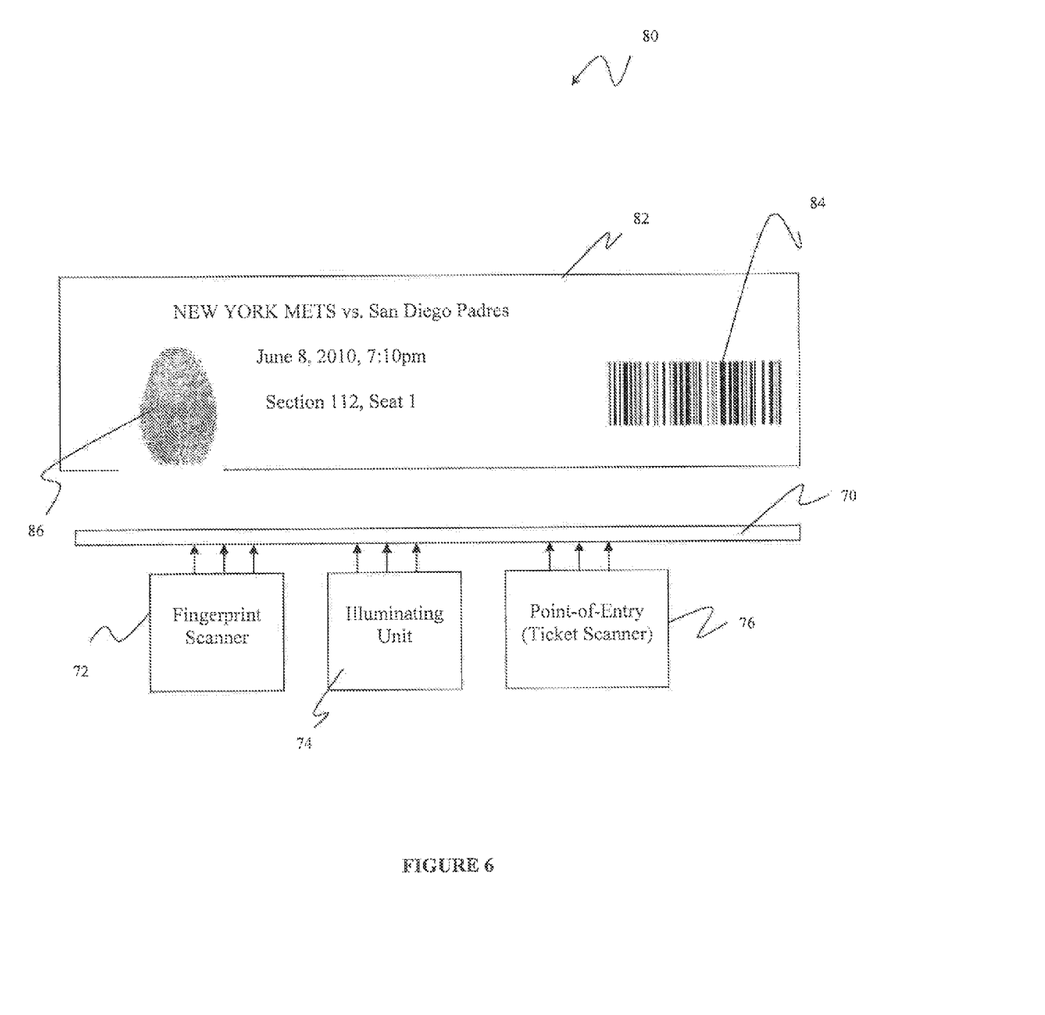
FIG. 6 is a perspective view of a sporting event ticket having a barcode and one or more fingerprints, the barcode and fingerprints being concurrently scanned by a fingerprint scanner and a ticket scanner at a point-of-entry, in accordance with the present disclosure.

With reference to FIG. 6, there is presented a perspective view of a sporting event ticket having a barcode and one or more fingerprints, the barcode and fingerprints being concurrently scanned by a fingerprint scanner and a ticket scanner at a point-of-entry, in accordance with the present disclosure.

The system 80 includes a baseball ticket 82 having a barcode 84 and a fingerprint 86. The fingerprint 86 may be a fingerprint of a consumer who wishes to enter the baseball game. A staff member (not shown) may handle the baseball ticket 82 by scanning the baseball ticket 32 over a piece of glass 70. Under the piece of glass 70 may be positioned a fingerprint scanner 72, a price scanner 76, and an illuminating unit 74. As the staff member makes several attempts to scan the barcode 68 over the price scanner 76, the staff member also inadvertently scans the fingerprint 86 over the fingerprint scanner 72. Optionally, such fingerprint 86 may then be collected and transmitted to a local or remote storage modules 42, 44 (see FIGS. 3 and 4) for storage. Additionally, such fingerprint 86 may be collected and transmitted via a transmitting unit 16 to a receiving unit 18 in operable communication with an analyzing unit 20 (see FIG. 1). The fingerprint image 86 may be analyzed by law enforcement personnel to determine if the collected fingerprint 86 match fingerprints stores in local or remote storage modules 42, 44 of criminals, fugitives or any other persons of interest.

Figure 7:
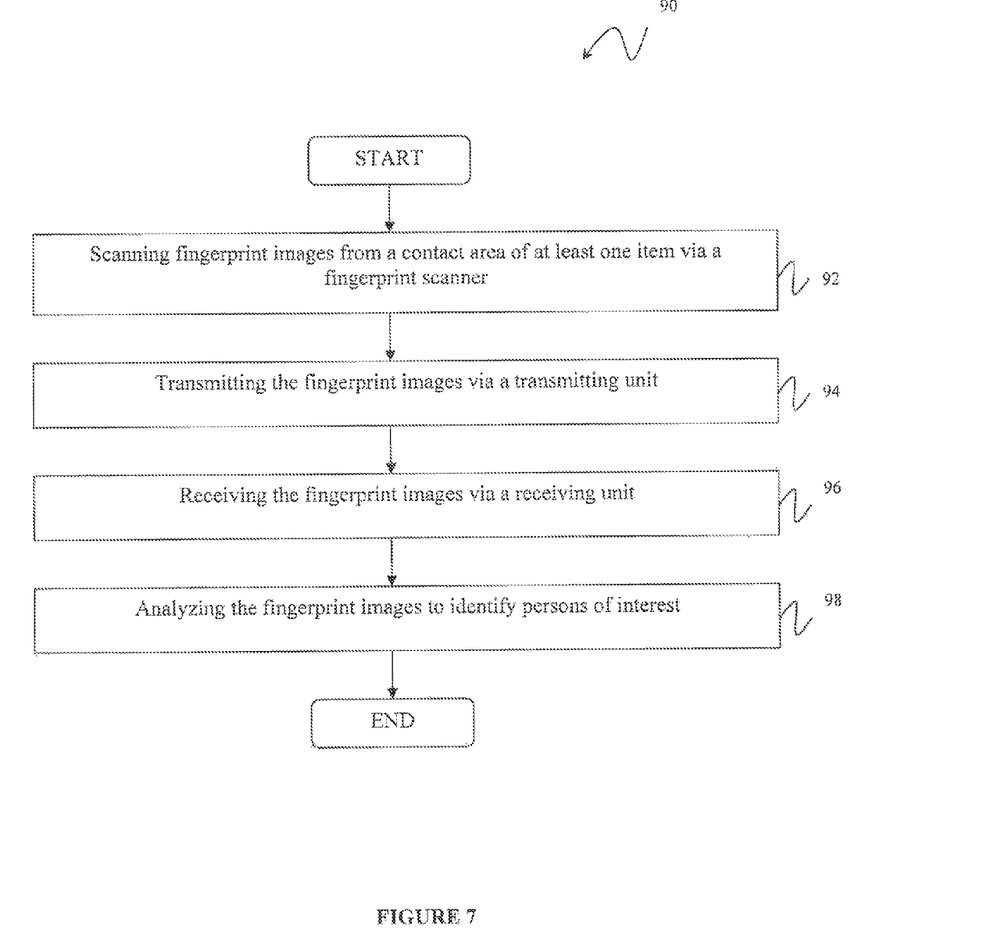
FIG. 7 is a flowchart illustrating how a fingerprint scanner operates in cooperation with a price scanner at a point-of-sale and/or a ticket scanner at a point-of-entry in order to collect, transmit, and analyze fingerprints, in accordance with the present disclosure.

With reference to FIG. 7, there is presented a flowchart illustrating how a fingerprint scanner operates in cooperation with a price scanner at a point-of-sale and/or a ticket scanner at a point-of-entry in order to collect, transmit, receive, and analyze fingerprints, in accordance with the present disclosure.

The flowchart 90 includes the following steps. In step 92, fingerprint images are scanned from a contact area of at least one item via a fingerprint scanner. In step 94, the fingerprint images are transmitted from a transmitting unit. In step 96, the fingerprint images are received via a receiving unit. In step 98, the fingerprint images are analyzed via an analyzing unit to identify persons of interest (e.g., criminals, fugitives, etc.). The process then ends for the first cycle or first iteration. However, the process may be a continuous iterative process. In other words, the steps of the process may repeat for a number cycles or iterations, where the scanning, transmitting, receiving, and analyzing steps are constantly repeated.

The illustrated devices or methods may be implemented in software, hardware, firmware or combinations thereof. The steps discussed herein need not be performed in the stated order. Several of the steps could be performed concurrently with each other. Furthermore, if desired, one or more of the above described steps may be optional or may be combined without departing from the scope of the present disclosure.

Optionally, the fingerprint recognition device may eliminate or discard fingerprints of a store clerk, checkout clerk or retail clerk who scans the items or tickets. In other words, if a specific fingerprint has been detected on several items in a store, over a number of days, or weeks, such fingerprint may be automatically discarded. Of course, all the store clerks of a grocery store and/or supermarket may provide fingerprints to the store manager, who can provide such data to law enforcement personnel. Law enforcement personnel may disregard such fingerprints from future searches.

Optionally, the fingerprint scanner may include a plurality of scanners and/or sensors for scanning the surface area of an item from a plurality of different angles. As a result, multiple images may be collected from a single fingerprint on an item. Additionally a sensor/scanner array may be used.

Optionally, an illuminating unit/module/device may be positioned adjacent the fingerprint recognition and collection device to illuminate the area scanned by the fingerprint scanner. The additional light may aid the fingerprint scanner in scanning higher quality fingerprint images. This light may be incorporated in addition to the built-in lights of the optical scanners and capacitive scanners described above.

Optionally, the operation of the price scanner may be connected to the operation of the fingerprint scanner. In other words, in one scenario, the price scanner may not go through until a fingerprint has been detected by the fingerprint scanner. In another scenario, the price scanner may not go through until a predetermined number of fingerprints have been detected. In another scenario, the price scanner may not go through if several items have been passed and no fingerprints have been detected. In other words, the price scanner operation may be dependent on the number of fingerprints detected on the current item or on previous items scanned. Optionally, an indicator (audible/visual) may be incorporated within the system block diagrams described herein to indicate to the store clerk if a fingerprint has been successfully detected by the fingerprint scanner.

The advantages of the present disclosure include at least providing a passive method of apprehending criminals, fugitives and/or persons of interest. Since a store clerk/retail clerk may conduct multiple swipes of an item in order to properly scan the bar code, there is a high probability that multiple fingerprint samples may be collected of individuals. These fingerprints may be collected and transmitted to law enforcement authorities for further processing/analyzing.

Supermarkets and/or grocery stores may recoup the initial investment of installing a fingerprint recognition and collection device by receiving monetary rewards for the number of criminals apprehended or captured. Of course, for example, the Federal Bureau of Investigation (FBI) may purchase and install such fingerprint recognition and collection devices in any type of supermarket and/or convenience store, where there is suspicion that criminals frequent. Supermarkets and/or grocery stores, such as Kroger™, Meijer™, Costco™, Safeway™, Sam's Club™, BJ's Wholesale Club™, Wal-Mart™, Kmart Super Centers™, Whole Foods Markets™, Supervalu™, A&P Supermarkets™, Waldbaum's™, Pathmark™, Piggly Wiggly™, Delhaize America™, Starbucks™, Target™, etc. and/or their affiliates/subsidiaries, may install such fingerprint recognition and collection device to aid local, state, and/or federal authorities with the passive apprehension of criminals. It is anticipated that such supermarkets and/or grocery stores may merely relay fingerprint information/data to central databases for law enforcement personnel to review and analyze for detecting the location of criminals and/or persons of interest. Such fingerprint information may be relayed to a vast array of local, state, and federal authorities/agencies/bureaus, such as the FBI, CIA, NSA, Department of Homeland Security (U.S. Secret Service, U.S. Customs and Border Protection, U.S. Immigration and Customs Enforcement, etc.), Department of State, Department of Transportation, Department of Justice, etc. This is merely a non-limiting example of who may send such information and who may receive such information in such fingerprint methods and systems described herein.

Data may also be collected to determine where certain types of criminals prefer to live. For example, law enforcement personnel may be able to keep track of the whereabouts of child molesters. For example, once a child molester is released back into society, such individual may move from town to town or city to city without informing the law enforcement agencies. Such an individual's fingerprints are pre-stored or prerecorded in a database. The exemplary embodiments of the present disclosure would permit law enforcement agencies to track the stores or events/venues at which such child molester frequents. Maybe the child molester lives in town A, but usually frequents towns B and C located, for instance, 100 miles away from town A to make store purchases because such store locations offer more opportunity for continued criminal activity. Of course, this is a non-limiting example and many more scenarios may be envisioned for deterring, apprehending, and/or capturing criminals or fugitives. As a result, law enforcement agencies may collect fingerprint data/information from a plurality of stores and/or entertainment venues across the country, continuously, in real-time, to determine where criminals/fugitives may be located. Additionally, the fingerprint data; information may be associated with time, day, and location information in order to provide law enforcement agencies with all the data/information they need to apprehend a criminal/fugitive. One skilled in the art may envision collecting, transmitting, and storing a plurality of different data in association with fingerprint data Moreover, law enforcement agencies may be potentially able to avert criminal activities, as well as potential terrorist attacks, by detecting where persons of interest shop for items. Additionally, the fingerprints collected may be correlated to items that an individual purchases. For example, an individual may purchase several suspect items or a large quantity of a suspect item. Such information may be relayed back to law enforcement officials. For example, suspect items may relate to items that enable a person to construct a bomb to advance a terrorist attack.

Concerning privacy issues, it is believed that under the Amendment that privacy issues would be inapplicable in such a scenario presented in the exemplary embodiments of the present disclosure. The $4^{th}$ Amendment (Amendment IV) to the United States Constitution is the part of the Bill of Rights which guards against unreasonable searches and seizures. The question is whether passively collecting fingerprints from individuals would violate the $4^{th}$ Amendment. In order to answer this question, one would pose the following inquiry: Does one have a reasonable expectation of privacy in their fingerprints? The criteria for determining if one has a reasonable expectation of privacy are as follows: 1) general legal principles; 2) the vantage point from which the surveillance is carried out; 3) the degree of privacy afforded by certain buildings and/or places; and 4) the sophistication and invasiveness of the surveillance technology employed. In the exemplary embodiments of the present disclosure, one does not have a degree of privacy in their fingerprints. By touching things/items in general, one gives up their privacy to their fingerprints. Thus, the systems and methods presented herein would be compatible and in line with important legal principles and would not violate the U.S. Constitution.

Additionally, when implemented via executable instructions, various elements of the present disclosure are in essence the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

The computer means may be operatively associated with the assembly, and is directed by software to compare the first output signal with a first control image and the second output signal with a second control image. The software further directs the computer to produce diagnostic output. Further, a means for transmitting the diagnostic output to an operator of the verification device is included. Thus, many applications of the present disclosure could be formulated. The exemplary network disclosed herein may include any system for exchanging data or transacting business, such as the Internet, an intranet, an extranet, WAN (wide area network), LAN (local area network), satellite communications, and/or the like. It is noted that the network may be implemented as other types of networks.

Additionally, "code" as used herein, or "program" as used herein, may be any plurality of binary values or any executable, interpreted or compiled code which may be used by a computer or execution device to perform a task. This code or program may be written in any one of several known computer languages. A "computer," as used herein, may mean any device which stores, processes, routes, manipulates, or performs like operation on data. A "computer" may be incorporated within one or more fingerprint recognition and collection systems or servers to operate one or more processors to run the fingerprint recognition algorithms. Moreover, computer-executable instructions include, for example, instructions and data which cause a general purpose computer, special purpose computer, or special purpose processing device to perform a certain function or group of functions. Computer-executable instructions also include program modules that may be executed by computers in stand-alone or network environments. Generally, program modules include routines, programs, objects, components, and data structures, etc. that perform particular tasks or implement particular abstract data types.

In conclusion, the present disclosure proposes an alternative method (e.g., of identifying and capturing criminals, fugitives) that takes advantage of "fingerprint recognition and collection" systems relating to processing and analyzing jobs/tasks/activities/capabilities on fingerprint scanners in order to make the process of fingerprint scanning simple and as streamlined as possible to provide for an efficient user experience. The concepts of using a "fingerprint system" and "fingerprint scanners" are general concepts in that they may be used for applications other than fingerprint systems by any service provider. For example, service providers could use any type of fingerprint system and/or electronic device to achieve the desired results of the present disclosure. Also the fingerprint system of the present disclosure may make it easier for service providers to manage/control/operate the fingerprint systems for their clients.

A service provider may be any entity that develops, offers, controls, manages, owns, alters and/or sells software and/or hardware products. A service provider may be any entity that performs one or more tasks on one or more pre-existing fingerprint systems, which may or may not be controlled or owned by the service provider. For example, the entity may offer a service with an existing software package and/or with any type of existing Internet-based service through the Internet. In other words, a service provider need not own or provide the fingerprint systems. The fingerprint systems may be owned or provided by any third party not related or associated with the service provider. In the present disclosure, it may be contemplated that the entity (such as a service provider) may offer any type of service and/or product to optimize pre-existing, pre-owned fingerprint systems by referring potential customers to an Internet website or a store that may or may not be associated with fingerprint system-related services and/or products. The term "entity" may refer to anything that may exist as a discrete and/or distinct unit that owns, operates, manages, and/or controls one or more of a plurality of machines (such as fingerprint systems). For example, the term "entity" may include the term "company." Thus, the exemplary embodiments of the present disclosure also cover service providers of fingerprint methods and systems.

It will be understood that there are to be no limitations as to the dimensions and shape of the fingerprint systems, including the storage compartment, or the materials from which the fingerprint systems are manufactured or the electronics that may be used to run such a fingerprint system and/or fingerprint scanners.

The foregoing examples have been provided merely for the purpose of explanation and are in no way to be construed as limiting of the present method and system disclosed herein. While the present disclosure has been described with reference to various embodiments, it is understood that the words, which have been used herein, are words of description and illustration, rather than words of limitations. Further, although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims. Those skilled in the art, having the benefit of the teachings of this specification, may effect numerous modifications thereto and changes may be made without departing from the scope and spirit of the present disclosure in its aspects.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Having described the present disclosure above, various modifications of the techniques, procedures, material and equipment will be apparent to those in the art. It is intended that all such variations within the scope and spirit of the appended claims be embraced thereby.

The foregoing examples illustrate various aspects of the present disclosure and practice of the methods of the present disclosure. The examples are not intended to provide an exhaustive description of the many different embodiments of the present disclosure. Thus, although the foregoing present disclosure has been described in some detail by way of illustration and example for purposes of clarity and understanding, those of ordinary skill in the art will realize readily that many changes and modifications may be made thereto without departing form the spirit or scope of the present disclosure.

The invention claimed is:

1. A system for detecting criminals, comprising:
a plurality of fingerprint devices each configured to receive a plurality of fingerprint data from a contact surface of each of a plurality of items handled by a subject without directly scanning a finger or finger region of the subject; and
an analyzing module for analyzing the plurality of fingerprint data collected by each of the plurality of fingerprint devices from each of the plurality of items handled by the subject to provide for a higher probability of deriving a clear fingerprint image therefrom in order to identify whether the subject is a criminal or fugitive or person of interest, and upon confirmation of the identity of the subject, contacting law enforcement, in real-time, to pinpoint a location of the subject.

2. The system according to claim 1, wherein the plurality of fingerprint devices operate in conjunction with a single price scanner.

3. The system according to claim 1, wherein the plurality of fingerprint devices operate in conjunction with a single ticket scanner.

4. The system according to claim 1, further comprising a comparison module for comparing the clear fingerprint image to stored fingerprint images for identifying whether the subject is the criminal or the fugitive or the person of interest.

5. The system according to claim 1, wherein the analyzing module is pre-configured to automatically discard fingerprint data related to a person scanning each of the plurality of items handled by the subject.

6. The system according to claim 1, wherein the analyzing module performs identity verification of the subject, the identity verification including at least one of pending lawsuits, judgments, liens, criminal records, charges, and convictions.

7. The system according to claim 1, further comprising a processing unit for indicating at least one of a time, day, and location of the plurality of fingerprint data scanned by each of the plurality of fingerprint devices.

8. The system according to claim 1, wherein the plurality of fingerprint devices are configured to scan the contact surface of each of the plurality of items from a plurality of different angles to provide for the higher probability of deriving the clear fingerprint image for comparison purposes.

9. The system according to claim 1, wherein each of the plurality of fingerprint devices are located at a point of sale (POS) location and/or point-of-entry (POE) location, the fingerprint device configured to operate in conjunction with at least a price scanner and/or ticket scanner.

10. The system according to claim 9, wherein the POS location and/or POE location is a grocery store or supermarket or venue.

11. A method of detecting a criminal, the method comprising:

receiving a plurality of fingerprint data, by each of a plurality of fingerprint devices, from a contact surface of each of a plurality of items handled by a subject without directly scanning a finger or finger region of the subject; and analyzing the plurality of fingerprint data collected by each of the plurality of fingerprint devices from each of the plurality of items handled by the subject to provide for a higher probability of deriving a clear fingerprint image therefrom in order to identify whether the subject is a criminal or fugitive or person of interest, and upon confirmation of the identity of the subject, contacting law enforcement, in real-time, to pinpoint a location of the subject.

12. The method according to claim 11, further comprising operating a single price scanner in conjunction with the plurality of fingerprint devices.

13. The method according to claim 11, further comprising operating a single ticket scanner in conjunction with the plurality of fingerprint devices.

14. The method according to claim 11, further comprising comparing the clear fingerprint image to stored fingerprint images for identifying whether the subject is the criminal or the fugitive or the person of interest.

15. The method according to claim 11, further comprising automatically discarding fingerprint data related to a person scanning each of the plurality of items handled by the subject.

16. The method according to claim 11, further comprising performing identity verification of the subject, the identity verification including at least one of pending lawsuits, judgments, liens, criminal records, charges, and convictions.

17. The method according to claim 11, further comprising indicating at least one of a time, day, and location of the plurality of fingerprint data scanned by each of the plurality of fingerprint devices.

18. The method according to claim 11, wherein the plurality of fingerprint devices are configured to scan the contact surface of each of the plurality of items from a plurality of different angles to provide for the higher probability of deriving the clear fingerprint image for comparison purposes.

19. The method according to claim 11, further comprising positioning at a point of sale (POS) location and/or point-of-entry (POE) location, each of the plurality of fingerprint devices configured to operate in conjunction with at least a price scanner and/or ticket scanner.

20. The method according to claim 19, wherein the POS location and/or POE location is a grocery store or supermarket or venue.

* * * * *